United States Patent [19]

Zukeran

[11] 4,365,935
[45] Dec. 28, 1982

[54] WIND-DRIVEN PRIME MOVER

[76] Inventor: Chousei Zukeran, 7-20, Midori 1-chome, Tsurumi-ku, Osaka-shi, Osaka-fu, Japan

[21] Appl. No.: 215,112

[22] Filed: Dec. 10, 1980

[30] Foreign Application Priority Data

Dec. 12, 1979 [JP] Japan .................. 54-161821

[51] Int. Cl.³ .................................. F03D 7/06
[52] U.S. Cl. .......................... 416/117; 416/139
[58] Field of Search ............... 416/139 A, 119, 117, 416/41 R, 118

[56] References Cited

U.S. PATENT DOCUMENTS

| | | | |
|---|---|---|---|
| 325,025 | 8/1885 | Tefft | 416/139 A X |
| 465,681 | 12/1891 | Smith | 416/52 A |
| 584,986 | 6/1897 | Chapman | 416/139 A X |
| 631,982 | 8/1899 | Bruce | 416/139 A X |
| 1,266,472 | 5/1918 | Howe | 416/240 A X |
| 1,319,766 | 10/1919 | Gracey | 416/117 |
| 1,352,952 | 9/1920 | Gracey | 416/240 A X |
| 1,364,681 | 1/1921 | Barto | 416/117 |
| 1,804,241 | 5/1931 | Whipp | 416/41 X |

Primary Examiner—Everette A. Powell, Jr.
Attorney, Agent, or Firm—Gabriel P. Katona

[57] ABSTRACT

A vertical type wind-driven prime mover comprises a vertically extending rotative main shaft, a plurality of horizontal support arms radially extending from the main shaft, a rectangular support frame body pivotally connected to the outer end of each of the arms, a rectangular wind receiving plate pivotally connected to each of the support frame bodies so that these plates are swingable only on the same one side of the respective support frame bodies, and a weight attached to each support frame body to maintain the latter substantially vertical until the wind speed reaches a given value.

5 Claims, 7 Drawing Figures

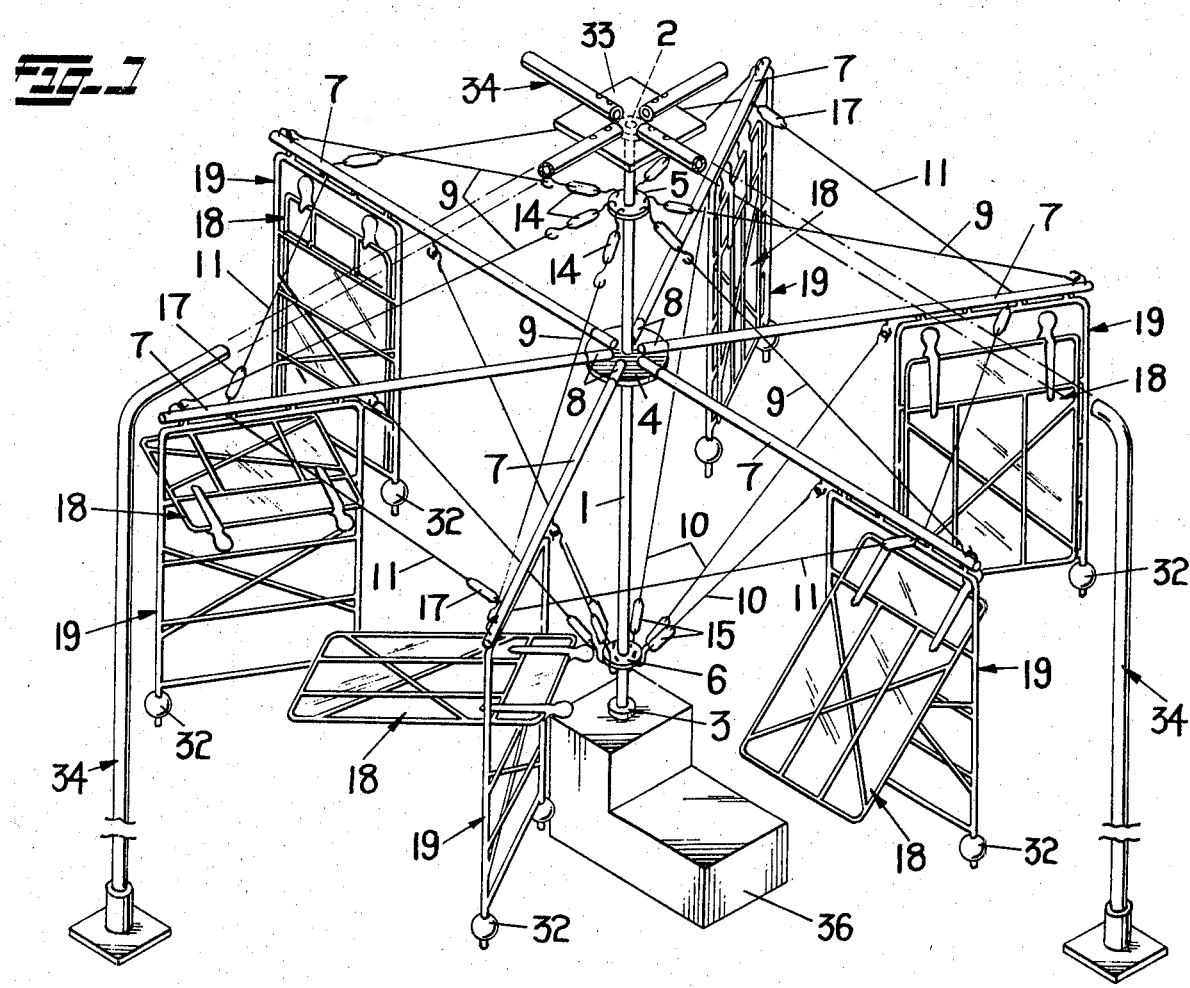

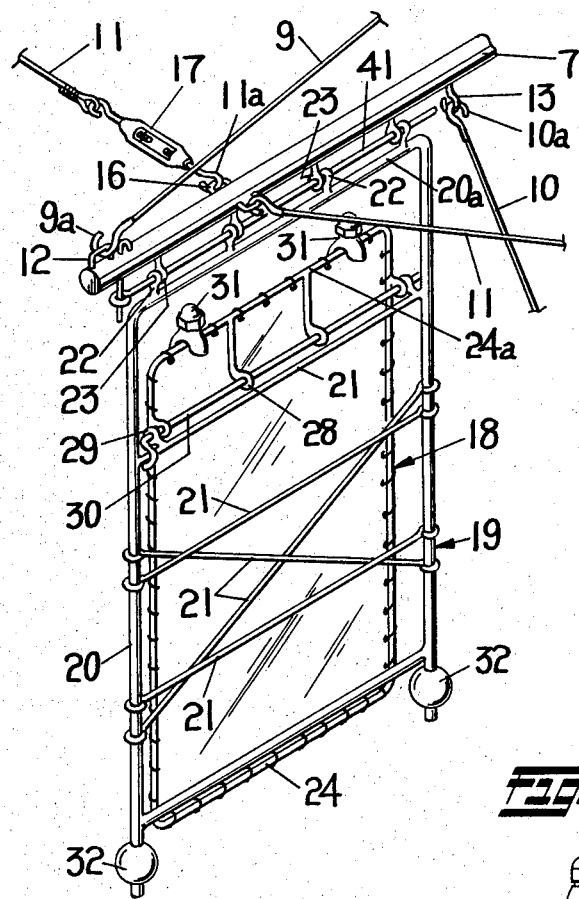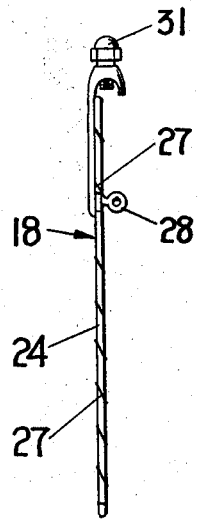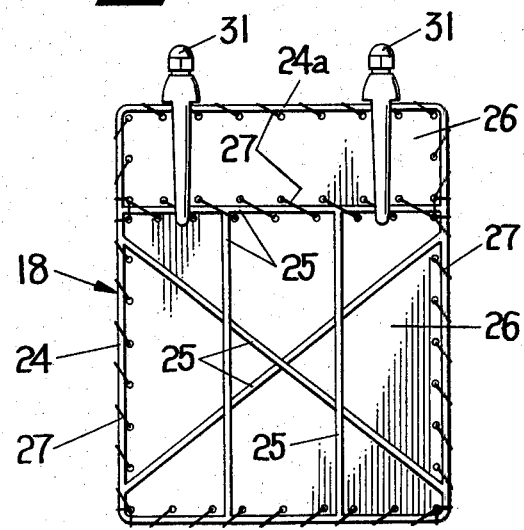

WIND-DRIVEN PRIME MOVER

BACKGROUND OF THE INVENTION

The present invention relates to a vertical type wind-driven prime mover utilizing natural wind forces and more particularly to a vertical type wind-driven prime mover which is designed so that even if the wind speed increases beyond a given value, the rotative speed of the main shaft can not increase with the increasing wind speed beyond to a given value.

It is necessary to limit the rotative speed of the main shaft of such prime mover because if the wind speed increases to excess as in a typhoon, it causes the main shaft to rotate at an extraordinarily high speed causing damage to e.g., the speed change device, connected to the prime mover or other problems such as undesirable pulsation of output energy due to irregular rotation. Heretofore, special devices, such as brakes and governors, have been attached to the main shaft or to the speed change device of wind driven prime movers to limit the rotative speed, but such brakes are large and expensive and increase the overall cost and, moreover, they cause problems.

An object of the present invention is to provide a vertical type wind-driven prime mover which is capable of positively limiting the rotative speed of the main shaft without using large and complicated devices.

Another object of the invention is to provide a vertical type wind-driven prime mover which can be installed at a relatively low position and which can be maintained or controlled with ease.

BRIEF SUMMARY OF THE INVENTION

A wind-driven prime mover according to the present invention comprises a vertically extending main shaft, a plurality of horizontal support arms radially extending from said main shaft, a wind receiving plate support frame body pivotally connected to the outer end of each of said support arms and wind receiving plates applied to one surface of the respective support frame bodies. The receiving plates are pivotally connected at their upper ends to the support frame bodies so that they are swingable only on the said one side of the respective support frame bodies. Weights attached to each of said support frame bodies have sufficient mass to maintain the support frame body substantially vertical until the wind speed reaches a certain value, thereby ensuring that the rotative speed of the main shaft does not increase any more once the wind speed exceeds the upper limit of a given range, although ordinarily it increases in proportion to the wind speed when the wind is within said given range. Speed limitation of the main shaft can be achieved by a simple construction as described above without requiring the conventionally employed large and complicated governor (brake) device. Pulsation of output energy due to irregular rotation of the main shaft can thus be avoided.

BRIEF DESCRIPTION OF THE DRAWINGS

FIG. 1 is a perspective view of a wind-driven prime mover, showing an embodiment of the present invention;

FIG. 2 is an enlarged detailed perspective view of a wind receiving plate support frame body shown in FIG. 1;

FIG. 3 is an enlarged detailed plan view of a wind receiving plate shown in FIG. 1;

FIG. 4 is a side view of the wind receiving plate of FIG. 3;

DESCRIPTION OF THE PREFERRED EMBODIMENTS

Figure 5:
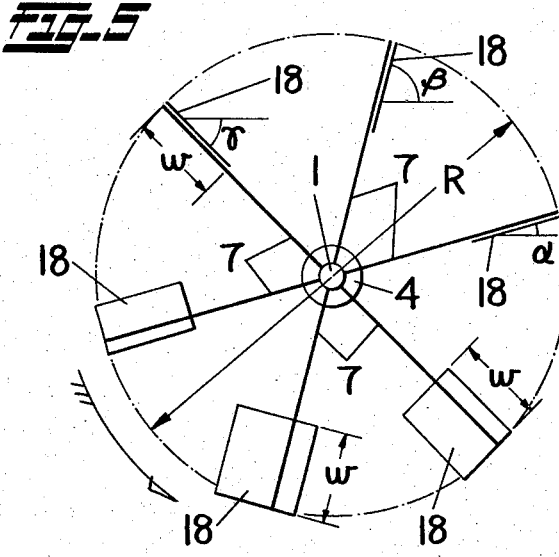
FIG. 5 is a schematic top plan view illustrating the action of the wind pressure on the wind receiving plates.

Referring to the drawings, the vertical main shaft 1 of a wind-driven prime mover is rotatably supported at its upper and lower ends in bearings 2 and 3. The main shaft 1 has circular flange members 4, 5 and 6 fixed to the middle portion and the upper and lower end portions thereof. A plurality of e.g., six, horizontal support arms 7 extending radially and disposed at equal spaced intervals around the axis of the main shaft 1 are removably attached at their inner ends to the middle flange member 4 by means of pipe-like attaching members 8. Each horizontal support arm 7 is prevented from vertically swinging by a wire 9 installed under tension between the outer end of said support arm 7 and the peripheral edge of the flange member 5 at the upper end of the main shaft 1 and by a wire 10 installed under tension between an intermediate portion of said support arm 7 and the flange member 6 at the lower end of the main shaft 1, and the horizontal support arms 7 are horizontally spaced apart from each other and held at their respective fixed positions by wires 11 each installed under tension between adjacent horizontal support arms 7. In this way they are firmly fixed at their predetermined positions. In addition, locking hooks 9a, 9a and 10a, 10a are provided at the opposite ends of each wire 9, 10, respectively. The inner hooks 9a and 10a are fitted in holes formed in the peripheral edges of the flange members 5 and 6, while the outer hooks 9a and 10a are fitted in rings 12 and 13 provided on the horizontal support arms 7. Turnbuckles 14 and 15 are provided for adjustment. Similarly, each end of each wire 11 is provided with a hook 11a which is fitted in a ring 16 on the horizontal support arm 7, and the wire 11 is adjusted by a turnbuckle 17.

The numeral 18 denotes wind receiving plates and 19 denotes wind receiving plate support frame bodies. Each wind receiving plate support frame body 19 is substantially in the form of a lattice composed of a rectangular outer frame 20 and a plurality of bone members 21. The upper end of each support frame body 19, namely, the upper frame member 20a of the outer frame 20 is pivotally connected to the outer end portion of the associated horizontal support arm 7. More particularly, as shown in FIG. 2, the upper frame member 20a and the outer end portion of the associated horizontal support arm 7 are provided with pluralities of annular hinge members 22 and 23, respectively, and a pivot bar 41 is inserted in these hinge members so that the support frame body 19 is swingable around the axis of said pivot bar 41. Each support frame body 19 has applied to one surface thereof a rectangular wind receiving plate 18 which is smaller than said support frame body 19. The upper end portion of the wind receiving plate 18 is pivotally supported by the support frame body 19 so that it is swingable only on one side of the support frame body 19. The wind receiving plate 18, as shown in FIG. 3, has a framework composed of an outer frame 24 and a plurality of reinforcing frame members 25, and pieces of lightweight and high tensile strength sailcloth 26 are applied to said framework, with the peripheral edges thereof wound around the framework and fixed thereto by an elastic string 27, such as a rubber string. As shown in FIGS. 4 and 2, a pivot bar 30 is inserted in annular hinge members 28 and 29 at the transverse center of gravity so that the wind receicing plate 18 is turnable only in one direction defined by an imaginary plane including the transverse center of gravity. Counterweights 31 are fixed to the upper frame portion 24a of the outer frame 24 of the wind receiving plate 18.

Weights 32 are removably attached to the lower end of the outer frame 20 of the wind receiving plate support frame body 19. These weights 32 serve to set an allowable upper limit to the wind speed, so that they hold the wind receiving plate support frame body 19 substantially vertical against the wind pressure on the wind receiving plate 18 until the wind speed reaches said upper limit. And yet the weights 32 are removably mounted on the lower end of the outer frame 20 of the support frame body 19. Therefore, when heavy weights 32 are used, the support frame body 19 provided with the wind receiving plate 18, withstands a great wind speed and can rotate at a high velocity to obtain the required amount of output energy. By substituting light weights for heavy ones, the rotative speed of the prime mover is limited, preventing damage and other problems with the device.

Figure 6:
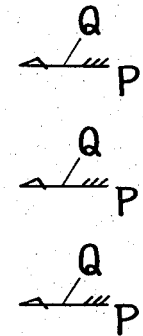
FIG. 6 is a schematic side plan view showing how the wind receiving plate support frame body is tilted.

In the operation of the wind-driven prime mover constructed in the manner described above when it is acted upon by the wind, as shown in FIG. 5, the horizontal support arms 7 are rotated counterclockwise as viewed in the figure with respect to the lines Q of the wind forces P. The three wind receiving plates 18 in the upper half of the circle of FIG. 5 are each positioned on the upstream side of the associated wind receiving plate support frame body 19 (which is omitted from the illustration in FIG. 5 since it underlies the associated horizontal support arm 7) with respect to the direction of the action of the wind forces P, so that they are subjected to the wind pressures at incident angles $\alpha$, $\beta$ and $\gamma$ and are supported by the respective support frame bodies 19. On the other hand, the three wind receiving plates 18 in the lower half of the circle of FIG. 5 are each positioned on the upstream side of the associated support frame body 19, so that even a slight amount of wind pressure acting on them is sufficient to cause the balance weights 31 to turn these wind receiving plates around the axes of the pivot bars 30 until said plates are parallel with the wind lines Q. Thus, the wind receiving plates 18 in the upper half of the circle counteract the wind pressures, while the wind receiving plates in the lower half of the circle do not resist them at all. Therefore, no matter what direction the wind lines Q may take, the rotation of the main shaft 1 will not be stopped or decreased. In addition, the above description refers to a case where the wind receiving plate support frame bodies 19 pivotally supported on the outer end portions of the horizontal support arms 7 are held substantially vertical and immovable relative to the pivot bars 41; in other words, the wind pressure (which is proportional to the square of the wind speed) is not so high as to turn the wind receiving plate support frame bodies 19 around the axes of the pivot bars 41. However, if the wind speed increases to produce so high a wind pressure that the weights 32 mounted on the support frame bodies 19 can no longer hold the support frame bodies 19 vertical, the latter start to turn forwardly around the axes of the pivot bars 41. In this case, as the support frame bodies 19 turn, the wind receiving plates 18 associated therewith are tilted so that they are subjected to less load due to the wind pressure than when they are in the vertical position. Therefore, even if the wind pressure increases, the torque acting on the main shaft 1 remains unchanged and therefore the rotative speed of the main shaft 1 does not change. For example, the arrangement is so designed that wind speed range to zero to 20 m/sec, the weights 32 are capable of holding the associated wind receiving plate support frame body 19 in the vertical position. Let P be the wind pressure when the wind speed is 20 m/sec. When the wind speed increases, e.g., to 30 m/sec and the resulting wind pressure P1 turns the support frame body 19 through an angle $\theta$ as shown in FIG. 6, the load on the wind receiving plate 18 is $P1 \times \cos \theta \times S$ (where S is the area of the wind receiving plate). In this case, although the rotative speed of the main shaft 1 changes with the wind speed ranging from zero to 20 m/sec, once the wind speed exceeds 20 m/sec, the rotative speed of the main shaft 1 does not increase any further. That is, the mass of the weights 32 determines the upper limit 20 m/sec of the wind speed. Therefore, when it is desired to increase the upper limit of the wind speed, e.g., to 30 m/sec, weights 32 having the corresponding mass may be used, in which case the rotative speed of the main shaft 1 will become constant once the wind speed exceeds 30 m/sec.

The provision of a number of wind receiving plates 18 and support frame bodies 19 causes disturbance to the wind passing between the wind receiving plates 18, tending to decrease the wind pressure. From this point of view, the effects of the wind speed and wind pressure on the wind receiving plates and on the durability of the prime mover itself have been studied. As a result, it has been found that the conditions which enable the wind receiving plates 18 to receive the wind pressure most efficiently to provide a stabilized torque for a long time without any trouble are that each wind receiving plate 18 has a horizontal width W which is R/n and a vertical height which is (1 to $\frac{2}{3}$) (R/n) where R is the radius of rotation of the horizontal support arms 7 and n is the number of wind receiving plates 18. Further, normally, as shown in FIG. 1, a speed change mechanism is installed at the lower end of the vertical main shaft 1 and its upper end is supported at the center of a support structure 34 by a shaft attaching plate 33.

Figure 7:
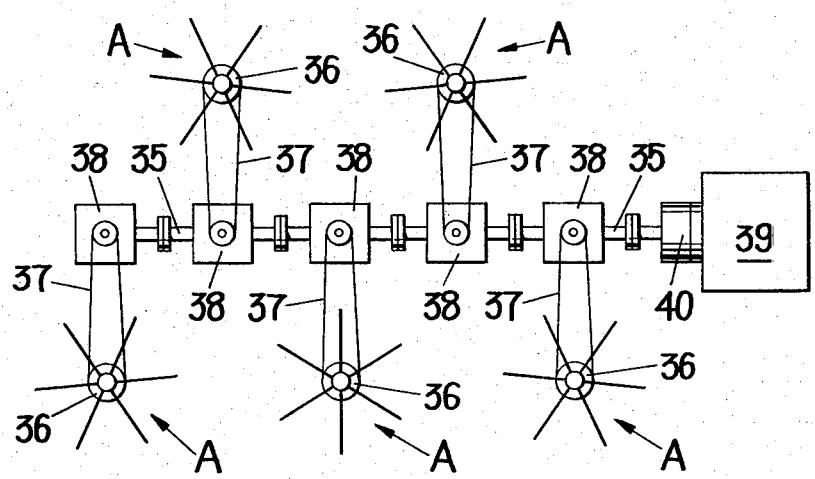
FIG. 7 is a schematic plan view of a planar arrangement of a plurality of wind-driven prime movers.

The embodiment shown in FIG. 1 is an example of a single wind-driven prime mover, but a plurality of such prime movers may be installed so that they work in coordination. An example of such arrangement is shown in FIG. 7 wherein wind-driven prime movers A according to the invention are provided on opposite sides of each horizontally disposed output take-off connecting shaft 35 and the driving force of each vertical main shaft 1 is transmitted to the associated connecting shaft 35 successively through a speed change mechanism 36, a V-velt 37 and a gear box 38 and then to a common power take-off machine 39 such as an electric generator, with a governnor 40 installed between the final connecting shaft 35 and the power take-off machine 39. Since the system thus constructed can be installed at a relatively low position, its maintenance and management are easy, and since at a low position it gives a high resistance to the passage of the wind, it has a feature that it can reduce the influence of a sudden gust of wind and the like.

What is claimed is:

1. A vertical type wind-driven prime mover comprising a vertically extending main shaft rotatably supported in bearings, a plurality of horizontal support arms equispaced and radially extending from said main shaft, a rectangular wind receiving plate support body frame pivotally connected to the outer end portion of each of said arms, a rectangular wind receiving plate pivotally connected to each of said support frame bodies so that these plates are swingable only on the same one side of the respective support frame bodies, and a weight attached to each of said support frame bodies to maintain the latter substantially vertical until the wind speed reaches a given value, wherein the sum of the horizontal widths of the wind receiving plates is approximately equal to the radius of rotation of said horizontal support arms and the vertical height of each wind receiving plate is ⅝-1 times said width; each wind receiving plate is pivotally supported by the associated wind receiving plate support frame body through a pivot bar at the transverse center of gravity of said wind receiving plate, and a counterweight is provided on the upper frame portion of the outer frame of said wind receiving plate; and said weight is removably mounted on the lower end of the outer frame of each wind receiving plate support frame body.

2. A vertical type wind-driven prime mover as set forth in claim 1, wherein each wind receiving plate support frame body is substantially in the form of a lattice composed of a rectangular outer frame and a plurality of bone members.

3. A vertical type wind-driven prime mover as set forth in claim 1, wherein each wind receiving plate is composed of a framework consisting of a rectangular outer frame and a plurality of reinforcing frame members, and a piece of lightweight and high tensile strength sailcloth stretched on said framework.

4. A vertical type wind-driven prime mover as set forth in claim 1, wherein said horizontal arms are fixed at their inner ends to said main shaft intermediate the ends thereof and are each held horizontal by a wire stretched between the outer end of the support arm and the upper end of said main shaft and a wire stretched between an intermediate portion of the support arm and the lower end of said main shaft and are held equispaced from each other on a horizontal plane by wires each stretched between adjacent horizontal support arms, each of said wires having a turnbuckle incorporated therein.

5. A vertical type wind-driven prime mover as set forth in claims 1, 2, 3, or 4, wherein a plurality of said vertical wind-driven prime movers are arranged with two of them positioned on opposite sides of each output takeoff connecting shaft and the main shaft of each prime mover is operatively connected to the associated connecting shaft.

* * * * *